United States Patent

Bond

[15] 3,678,180

[45] July 18, 1972

[54] RADIO FACSIMILE POSTAL SYSTEM FOR MULTIPLE ADDRESSEES

[72] Inventor: Donald Spencer Bond, Princeton, N.J.

[73] Assignee: RCA Corporation

[22] Filed: Oct. 9, 1970

[21] Appl. No.: 79,574

[52] U.S. Cl. ....................................... 178/5, 178/5.1, 178/6
[51] Int. Cl. ....................................... H04n 7/16
[58] Field of Search ....................... 178/5, 5.1, 5.1 CS, 5.1, 6, 178/DIG. 22; 179/2 DP

[56] References Cited

UNITED STATES PATENTS 2,599,904 6/1952 Evans ....................................... 178/5
2,902,538 9/1959 Edgar ....................................... 178/5

*Primary Examiner*—Robert L. Griffin
*Assistant Examiner*—Joseph A. Orsino, Jr.
*Attorney*—Eugene M. Whitacre

[57] ABSTRACT

A radio facsimile postal system in which a plurality of code signals uniquely identifying the addressees to receive a "third class" mailing are sequentially transmitted prior to the transmission of image signals representative of the written message. In this manner, system subscribing addressees to receive such mailing will have the radio facsimile recorders of their receivers conditioned to respond to the particular message information subsequently transmitted.

6 Claims, 4 Drawing Figures

INVENTOR.
Donald S. Bond
BY Charles Brodsky
ATTORNEY

INVENTOR.
Donald S. Bond
BY Charles Brodsky
ATTORNEY

INVENTOR.
Donald S. Bond
BY
Charles Brodsky
ATTORNEY

RADIO FACSIMILE POSTAL SYSTEM FOR MULTIPLE ADDRESSEES

BACKGROUND OF THE INVENTION

1. Field of the Invention

This invention relates to radio facsimile transmission systems and, more particularly, to an improvement of the radio facsimile postal system described in my co-pending application Ser. No. 701,642, (now U.S. Pat. No. 3,594,495) filed Jan. 30, 1968, and assigned to the same assignee as this instant application.

2. Description of the Prior Art

The system described in my aforesaid application includes a "radio mailbox" in which a deposited letter to be sent is electronically scanned and converted into corresponding image signals. Coaxial lines, radio relay links, or the like, are also included, to transmit those image signals to a central or "electronic" post office, where a computer or other appropriate storage unit adds a predetermined electrical address code to the image signals, indicative of the name and address of the one person for whom the letter is destined. The composite message, i.e., image and code signals together, is then directed by way of a transmitter and either microwave relay network or satellite in synchronous equatorial orbit, for example, to that geographical area in which "delivery" is to be made. A radio facsimile recorder located at the situs of the addressee is conditioned to respond only to message signals having that identifying address code, to provide a permanent copy of the transmitted letter.

Such a system is particularly suited to "first class" mail delivery — where a single written communication is transmitted to a single recipient or addressee in substantially complete privacy — i.e., as no one other than the sender and the addressee will have access to the communication. However, it will be apparent that such a system may be redundant in case of "third class" mail delivery, wherein the same message is intended for facsimile transmission to many addressees. That is, whereas my previously noted system operates by transmitting a code signal and message information for one recipient, it would be overly burdensome to re-transmit the message information with each and every addressee code identifying the recipient of the "third class" message.

SUMMARY OF THE INVENTION

As will become clear hereinafter, the instant invention is especially attractive for multiple addressee use, and is designed to provide a single message in facsimile form for transmission to a selected list of addressees. To eliminate the necessity of re-transmitting the message information for each recipient, the system of the invention operates first, to sequentially transmit the identifying codes associated with each intended addressee (so as to thereby condition each identified recorder to reproduce the message) and second, to then transmit the "third class" message information.

It will be apparent that such a modified postal system can greatly reduce the physical costs involved in delivering this bulk mail. It will also be seen that such a system will significantly reduce the time between the sending and receipt of mail, and will additionally greatly cut the tremendous rail, plane and ship tonnages involved in such "third class" deliveries.

Accordingly, it is an object of the present invention to provide a radio facsimile postal system for use where a single message is intended for "third class" transmission to a multiple number of addressees.

It is a further object of the invention to provide such a system which will be compatible with the "first class" system disclosed in my Ser. No. 701,642 application.

BRIEF DESCRIPTION OF THE DRAWINGS

These and other objects of the invention will be more clearly understood from a consideration of the following description taken in connection with the accompanying drawings in which.

DETAILED DESCRIPTION OF THE INVENTION

Figure 1:
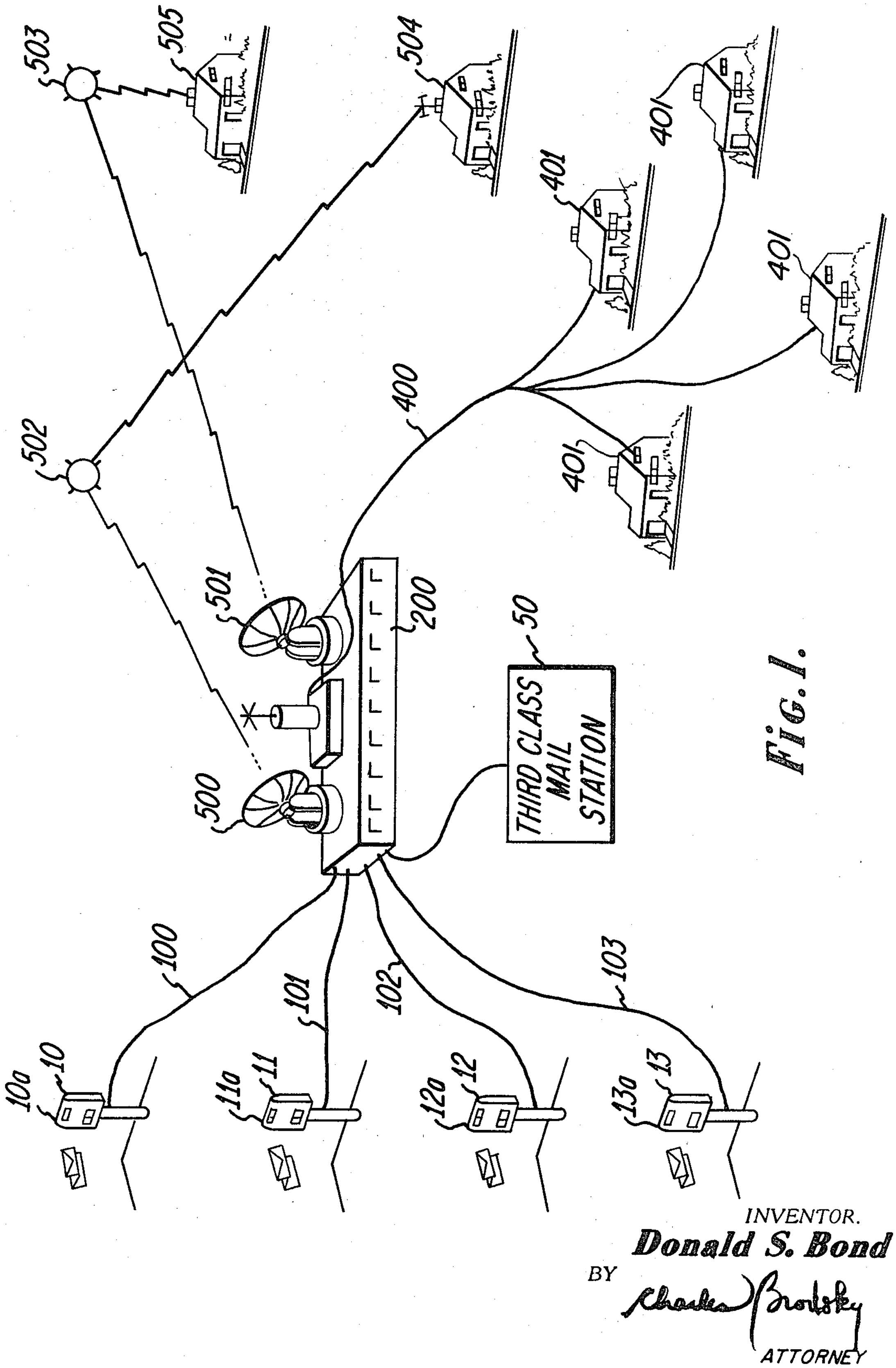
FIG. 1 is a pictorial diagram showing one embodiment of the radio facsimile postal system of the type described in my Ser. No. 701,642 application, and modified to provide the multiple address capability in accordance with the present invention.

Referring now to FIG. 1, the radio facsimile postal system pictorially shown includes a central or "electronic" post office 200 coupled by means of coaxial lines, radio relay links, or the like, 100, 101, 102, 103, etc. to a plurality of electronic scanner units or "radio mailboxes" 10, 11, 12, 13, etc. When an information storage unit in the central post office 200 which serves the sender's "radio mailbox" is ready and comes on the line, a signal is sent from the post office 200 (in much the same way as with a telephone dial tone) directing an electronic scanner included in the selected "mailbox" to verify the postage affixed to a deposited letter or other type of written communication. The scanner is also conditioned to scan the letter and to convert its heading address and message into video or image representative signals. If the letter to be communicated consists of more than one sheet, the sender feeds the remaining sheets into the scanner slot **10*a*, 11*a*, 12*a*, or 13*a***, etc., in a sequential manner for successive conversion to image signals.

The image representative signals so developed are carried along the connecting coaxial line, radio relay link, or the like, to the central office 200 where they are recorded in an information storage unit associated with the electronic scanner in use, while a "privacy code" is supplied by a data processing memory file indicative of the name and address of the one person for whom the letter is destined. Because this code is uniquely associated with only one individual, the addressee, and because this code is securely maintained in the central office, assurance against unauthorized eavesdropping or interception of the transmission is afforded.

One arrangement for the transmission of these composite messages to desired addressees disclosed in the aforesaid Ser. No. 701,642 application (U.S. Pat. No. 3,594,495) employs one or more satellites operating in synchronous equatorial orbit. Transmissions from New York to an addressee location 504 in the midwestern part of the United States, for example, can be accomplished by directing the transmitter 500 at the satellite 502 located on the 90° west meridian, while similar transmission to an addressee location 505 on the west coast of the United States can be accomplished by transmitting from the transmitter 501 towards the satellite 503 situated on the 120° west meridian. Mail "deliveries" for specific localities served by these satellites can be had by radiating from the satellite from several transmitters included thereon, operating on a different frequency for each location and beamed into the same general geographical area, or on the same frequency for all locations but beamed into different geographical areas.

As so far described, the radio facsimile postal system of FIG. 1 is identical to that disclosed in my copending application, and is particularly suited for "first class" transmission wherein a single message is destined for a single, uniquely defined addressee. Many instances arise, however, wherein a single message is desired to be transmitted to a class of addressees, rather than to a single uniquely defined individual. For example, an automobile manufacturer might wish to direct his advertising message only to licensed drivers in a certain income bracket. Other manufacturers might wish to direct their messages to individuals having specific hobbies, tastes, organizational memberships, etc. Similarly, a department store might wish to inform its preferred (e.g., charge card) customers of an upcoming sale prior to advertising that event to the general public. Such a "first class" system as described above—while perfectly adaptable to such an arrangement— somewhat less than its fullest extent if each transmission is to include the repeated message information along with the "-privacy code" signal identifying each intended recipient.

Thus, the radio facsimile system of FIG. 1 is modified in accordance with one embodiment of the invention to include a "third class" mail station 50 to select, according to a predetermined classification, those privacy codes identifying those addressees to which a bulk advertising is to be sent. In particular, as will be seen below, the mail station 50 operates to sequentially send such code signals to the central post office 200 along with the "third class" message information for transmission in much the same manner as with mailboxes 10, 11, 12, 13, etc. Thus, transmission of this "third class" type of mail may also be effected through the use of the orbiting satellites 502, 503, etc; but, for simplicity of the drawing, such transmission is shown as being routed through a community antenna television (CATV) network 400 serving that area to which the multiple addressees 401 are connected. (In this respect, it will be understood that network 400 may comprise a system of coaxial cable circuits for carrying the desired information to a plurality of receiving units, and is especially useful where the transmissions are not so nationwide as with the satellite configuration. Such arrangements would therefore prove attractive for local department store advertising to preferred charge card customers.)

Figures 2A, 3:
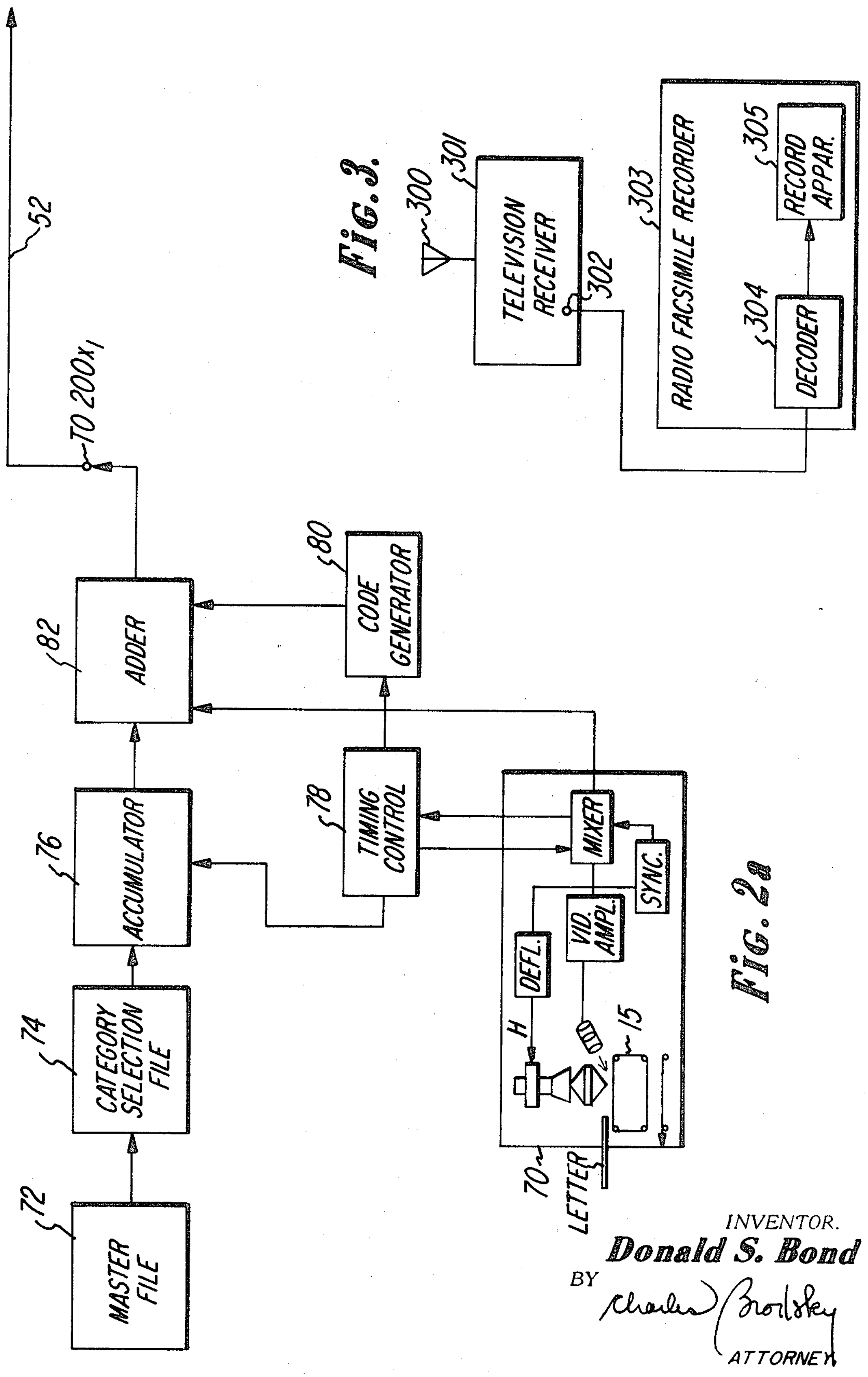
FIGS. 2*a* and 2*b* are block diagrams showing arrangements for the transmitting portion of the postal system of FIG. 1.
FIG. 3 is a block diagram showing one arrangement for the receiving portion of the FIG. 1 postal system.
Figure 2B:
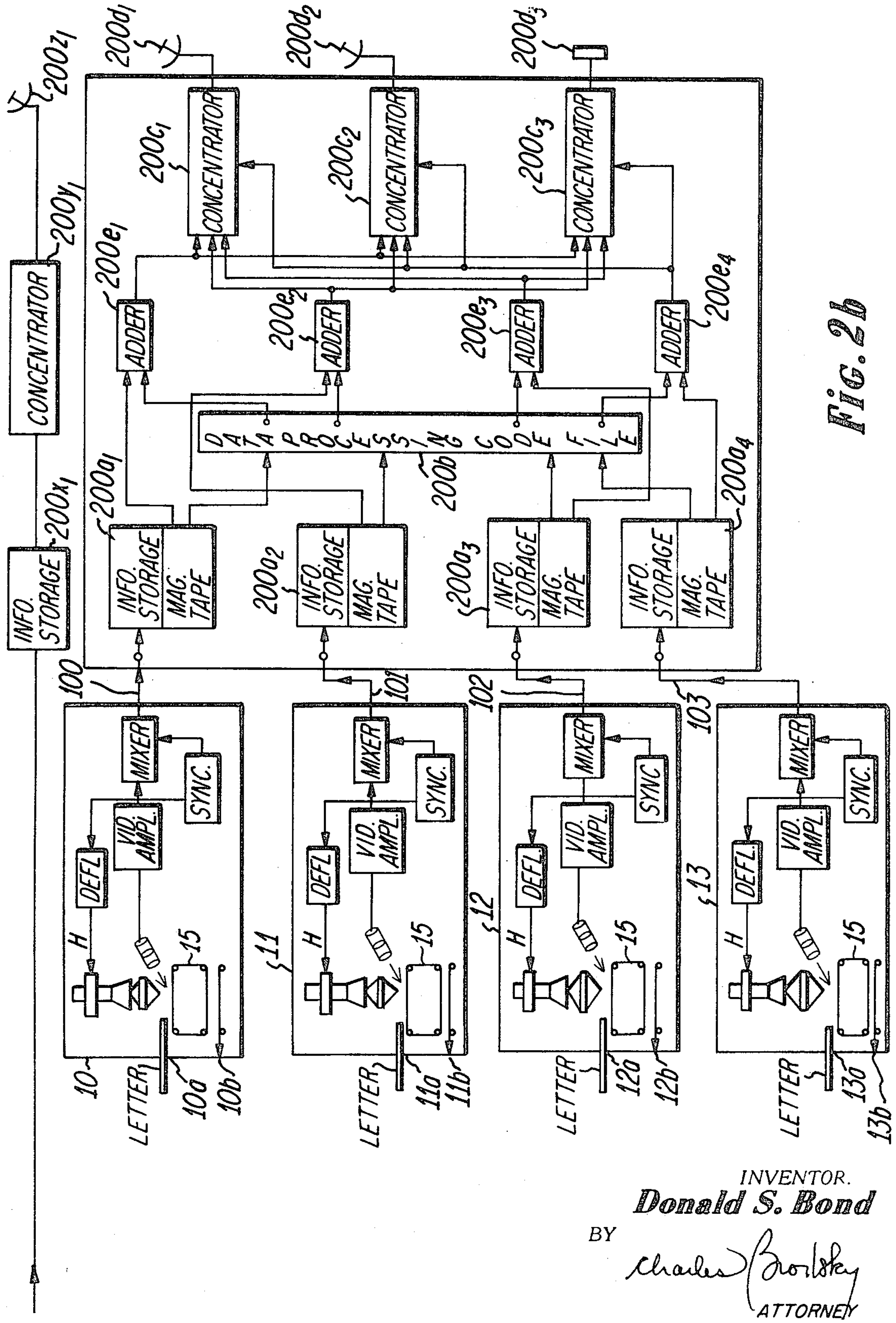

Referring now to FIG. 2*b*, it will be understood that the arrangement there shown is operable both for the sending of "-first class" mail—where each transmission comprises one code signal with a single message information— and for the sending of "third class" mail—only one transmission is sent comprising a series of code signals identifying all intended recipients followed by the image signals representative of the advertising or descriptive matter. It will also be understood that the arrangement is useful both in those instances where the advertiser supplies the "third class" mail station with the names and addresses of the intended recipients as well as where the advertiser only provides the classification of recipients to which his advertising is to be sent (e.g. over $20,000 income, homeowner, Republican, Democrat, etc.)

As far as the "first class" portion of the transmitting arrangement of FIG. 2*b* is concerned, it will be understood that that arrangement includes the insertion slots 10*a*, 11*a*, 12*a*, 13*a*, etc. of the "radio mailbox" or electronic scanning units 10, 11, 12, 13, etc., which generate image signals representative of the written message to be transmitted, including its assigned destination. These units may each be of the well known flying spot type, as shown, with the belt system 15 of each serving to return the written message to the sender via the slots 10*b*, 11*b*, 12*b*, 13*b*, etc., after the conversion of the message to corresponding image signals. As previously noted, the coaxial lines 100, 101, 102, 103, etc., carry these signals to the central post office 200 servicing, for example, all the scanner units employed in the sender's city.

The central post office of the system includes a plurality of information storage units $200a_1$, $200a_2$, $200a_3$, $200a_4$, the precise number being determined by the number of "radio mailbox" scanners linked to the post office 200, by the delay in establishing the operability of the information storage units, and by the capacity of each storage unit. Indicated as including magnetic tape recorders in FIG. 2, these information storage units each record the image signals, with a typical 400 kHz bandwidth, representative of the messages to be communicated and are designed to shut down upon completion of the individual message recordation.

Also included in the central post office are means responsive to the image signals representative of the preassigned destination for providing code signals uniquely identifying the destination as to location. Indicated by the data processing code file unit 200*b*, such means respond to the image representative destination signals to select from its memory that one code signal which identifies the particular addressee for whom the message is intended. The code signal, for example, may be in the form of a digital code gleaned from a predetermined characteristic in the message heading address, such as a telephone subscriber code or social security number. The code signals provided by the unit 200*b* are supplied when playback of the stored image signals is directed, to a plurality of adder unit $200e_1$, $200e_2$, $200e_3$, $200e_4$, etc., which multiplexes the code signal with the image signals in an appropriate manner to form composite radio facsimile messages for transmission.

The central post office 200 further includes a plurality of concentrater units $200c_1$, $200c_2$, $200c_3$, which units route the radio facsimile messages in numerical sequence to one of a like number of transmitters to complete the transmission. That is, the concentrator unit $200c_1$ scans the code signal outputs of the multiplexer adders $200e_1$, $200e_2$, $200e_3$, $200e_4$, etc., in turn, and sequentially couples, for example: (a) all image and code signals directed for transoceanic communication to a transmitter $200d_1$ serving the prescribed area by means of a first satellite in synchronous equatorial orbit; (b) all image and code signals directed for cross-country communication to a transmitter $200d_2$ serving the intended area by means of a second such satellite; and (c) all such signals directed for local communication to the input of a CATV network operating within that region. Each concentrator typically may include its own magnetic tape recorder in which the message information to be routed to its respective transmitter is stored prior to the actual transmission. In a typical arrangement, the video bandwidth capability of the concentrators $200c_1$, . . . etc., may each be of the order of 4 MHz.

Transmission from each of the units $200d_1$ and $200d_2$ in FIG. 2*b* may be at a single frequency or at different frequencies, depending upon the design of the satellite station employed. Where the satellite design is such that re-radiated message signals can be assigned different identifying frequencies in response to transmitted code signals signifying different geographical locations, the message transmissions can be at a single frequency. Where the design is such that different identifying frequencies cannot be determined in response to differing code signals, then the message transmissions will be at differing frequencies. In this way, a satellite serving the west coast of the United States, for example, can re-radiate message signals destined for California at a frequency $f_1$, those destined for Oregon at a frequency $f_2$, those for Washington at a frequency $f_3$, etc. Several antennas or a single phased array capable of forming a number of independent beams may thus be used.

Such a transmitting arrangement as has just been described is similar in many respects to that disclosed in my aforesaid Ser. No. 701,642 application (U.S. Pat. No. 3,594,495), and is particularly suited for "first class" mailing. A modified arrangement is used for "third class" mailing, but in such a manner as to be compatible with the "first class" system. Such compatibility therefore will enable the subscriber's receiving unit to reproduce both "first class" and "third class" transmissions without the need for any modification in his recorder.

Thus, the "third class" mail station 50 includes a facsimile scanner 70 (generally similar to the radio mailbox scanner 10) to generate image signals representative of the bulk advertising message to be sent the selected class of system subscribers. Such scanning apparatus may typically be located on the premises of an advertising firm or the like, specializing in preparing bulk mailings for selected recipients. The mail station 50 also includes a computerized memory unit or master file 72, a sorter or category selection file 74, and an accumulator or memory unit 76. The master file 72 may comprise a magnetic tape unit or a conventional digital date processer, for example, in which are stored the identifying codes of all subscribers to the radio postal system, and from which only those codes identifying the intended recipients of the "third class" mailing are selected.

As will be appreciated, the category selection unit 74 is preset according to the advertiser's instructions to select from the master file 72 only those address codes identifying the desired class of recipients. Thus, the initial entry in the memory unit 72 would comprise an address word representative of subscriber name and address (i.e., the privacy code signal), together with a series of shorter words representing classification category information (e.g., income bracket, age bracket, geographical location, political affiliation, etc.). Sequential scanning by the unit 74 according to the preselected classification thus generates a read-out for the accumulator 76 of address codes serially identifying those recipients to whom the message is to be sent. Accumulator 76, in this respect, serves to temporarily store this "mailing list" of selected address codes and to serve as a concentrator of all codes thus selected.

Also shown in FIG. 2*a* are a control unit 78, a code generator 80, and an adder 82. The unit 78 is selected to time control the accumulator 76 such that, prior to the transmission of the "third class" message (at time, $t_1$), the identifying address code signals selected by the sorter 74 are sequentially read into the adder 82 for subsequent sending to the central post office via the link 52, and then for transmission through its satellite or CATV network to alert the selected receiving units as to a forthcoming message transmission. The unit 78 also develops a control signal directing the generator 80 to thereafter provide (at time, $t_2$) a "start" code signal for the adder 82. Such signal, when transmitted in a similar manner through the central post office and its satellite or CATV arrangement, then serves to initiate the recording of those alerted subscriber receivers. The unit 78 subsequently provides (at time, $t_3$) a "read" control signal for the facsimile scanner apparatus 70 to control its flying spot conversion such that the developed image representative message signals are coupled to the adder 82 and transmitted to the selected subscribers at, or after, the startup of the receiving units effected by the "start" code signal. After sufficient time has elapsed for the transmission of the advertising message scanned by the unit 70 (at time, $t_4$), the control unit 78 directs the code generator 80 to provide a "stop" code control signal for transmission to the receiving unit to shut down its recording circuits.

It will be noted by those skilled in the art that the nature of the signals developed at the output of the adder 82 in this "third class" environment are of the same form as—and, therefore, compatible with—those coded signals as are present with the "first class" system. However, as no need exists to further code these "third class" signals as to preassigned destination, it will be appreciated that the output signals from adder 82 may be coupled directly from an information storage unit $200x_1$ (in which they are temporarily stored) to a concentrator unit $200y_1$. Both these units $200x_1$ and $200y_1$ may be similar to the previously described "first class" signals in numerical sequence to one or more of the transmitters $200z_1$ at the central post office for the message transmission. It will thus be seen that the "first class" messages may be intermixed with the "third class" messages, and that the latter consist of the sequential transmission of addressee identifying signals, "-start" code signals, message representative signals, and "stop" code signals.

The block diagram of the receiving unit for the electronic postal systems is shown in FIG. 3 and will be understood to be identical to that disclosed in my Ser. No. 701,642 application. By virtue of the compatibility built into the transmitting arrangement of FIG. 2, it will be appreciated that the individual receiving unit will function substantially identically whether "-first class" or "third class" transmissions are being received.

Thus, the arrangement of FIG. 3 includes a directive antenna 300 coupled to a television type receiver 301 which is modified somewhat to make the received video signal available at an output terminal 302. The video signal is coupled from the terminal 302 to a radio facsimile recorder 303, which though shown as a separate unit, may be an integral part of a console including the television receiver 301. The recorder 303 is preset by an included decoder 304 to respond only to the presence of a unique code signal in the applied video signal, and all such decoder units are assigned different code signals with which to operate. Moreover, the code signal to which each decoder 304 is preset to operate with is set to exactly correspond with the code signal added to the message representative image signals by direction of the data processing unit 200b at the central post office 200 or category selector 74 at the mail station 50 (FIG. 2), in identifying the recipient of the desired communication. When a code signal is then received which matches that preset into the decoder 304, the entire message representative video signal is coupled from the output terminal 302 to the recording apparatus 305 of the unit 303, which then operates to reproduce the message information in an appropriate manner. Since the only recording apparatus which will respond to the received message signal is that located at the addressee's location, complete privacy will continue to be assured because the reproduced hard copy will be generated only in the addressee's home or office.

What is claimed is:

1. In conjunction with a radio facsimile postal system of the type in which image signals representative of a written message to be communicated are transmitted together with a code signal uniquely identifying the addressee and in which received image signals are reproduced only by that recorder unit conditioned to respond to the transmitted code signal identifying the assigned addressee, the combination comprising:

electronic scanner means providing image signals representative of a written message to be transmitted to selected ones of a plurality of addressees;

electronic memory means storing code signals uniquely identifying each addressee and category classification signals representative of determinable characteristics attributable to each of said addressees;

category selection means coupled to said electronic memory means and responsive to selective direction to provide as an output thereof those identifying code signals associated with addressees having those characteristics to which said category selection means is conditioned to respond;

timing control means;

adder means having a first input terminal coupled to said electronic scanner means, a second input terminal coupled to said category selection means and a third input terminal coupled to said timing control means forming composite signals for transmission in which the code signals selected from said category selection means precede in time those image signals provided by said scanner means which are representative of written messages intended for plural transmission;

transmitter means;

and means coupling said composite signals from said adder means to said transmitter means for plural transmission to said assigned addressee destinations for message reproduction.

2. The combination of claim 1 in which there is also included coding means having an input terminal coupled to said timing control means and an output terminal coupled to said adder means for generating a code signal at said output terminal for application to said adder means along with said image representative and category code signals to initiate image reproduction by those of said recorder units conditioned for response by the identifying signals provided by said category selection means.

3. The combination of claim 2 wherein said coding means also generates a code signal at said output terminal at a time subsequent to the transmission of said image representative signals for application to said adder means to terminate said image reproduction by said recorder units.

4. The combination of claim 3 wherein said electronic scanner means includes a flying spot scanner.

5. The combination of claim 4 wherein said transmitter means comprises an earth satellite repeater.

6. The combination of claim 4 wherein said transmitter means comprises a CATV network.

* * * * *

UNITED STATES PATENT OFFICE
CERTIFICATE OF CORRECTION

Patent No. 3,678,180 Dated 7-18-72

Inventor(s) Donald Spencer Bond

It is certified that error appears in the above-identified patent and that said Letters Patent are hereby corrected as shown below:

Column 1, Line 37 - change "massage" to -- message --.

Column 3, Line 1 - before "somewhat" insert -- will be seen to be used at --

Column 3, Line 27 - delete " FIGURE 2b " and insert -- FIGURES 2a and 2b --

Column 3, Line 42 - delete "FIGURE 2b" and insert -- FIGURES 2a and 2b --

Column 3, Line 42 - delete "is" and insert -- are --

Column 4, Line 67 - change "date" to -- data --

Column 5, Line 50 - after "first class" insert -- units, and cooperatively serve to route the "third class" --

Signed and sealed this 6th day of February 1973.

(SEAL)
Attest:

EDWARD M. FLETCHER, JR.
Attesting Officer

ROBERT GOTTSCHALK
Commissioner of Patents